Patented Dec. 11, 1951

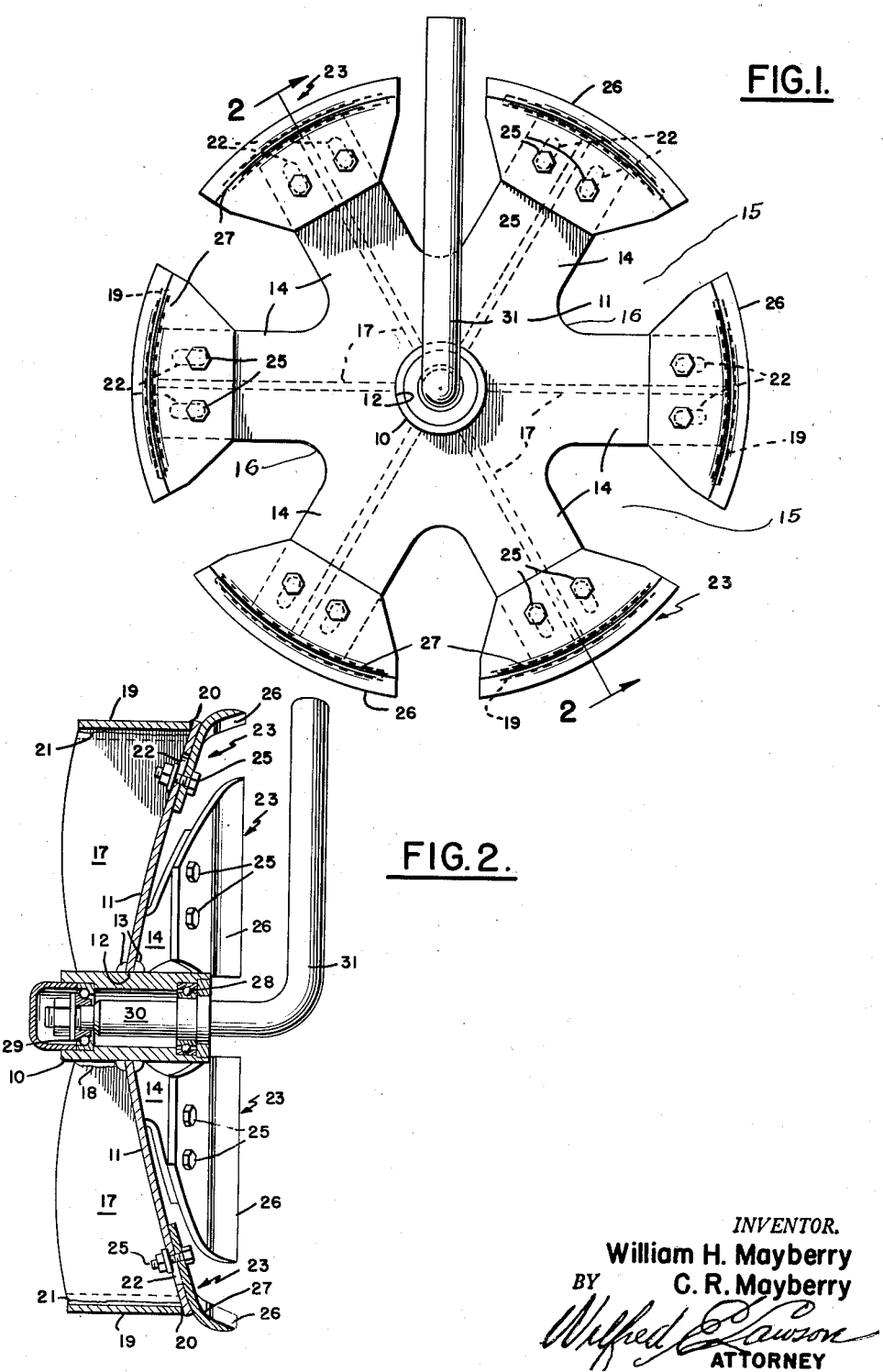

2,578,365

UNITED STATES PATENT OFFICE 2,578,365

COTTON CHOPPER

William H. Mayberry and C. R. Mayberry, Kennett, Mo.

Application May 12, 1949, Serial No. 92,934

1 Claim. (Cl. 97—217)

This invention relates to agricultural machinery and more particularly to cotton choppers.

The primary object of the invention is to provide a cotton chopper adapted to be attached to the front plow connection of a cultivator or the like and to be driven by friction between the ground and portions of the cotton chopper.

Another object of the invention is to provide a cotton chopper of the character indicated above comprising a rotatably mounted tubular hub, a concave cutter disc mounted on said hub so that the two members are coaxial with each other and a plurality of chopper blades supporting cutter spokes formed on the concave cutter disc.

A further object of the invention is to provide a cotton chopper of the character indicated above including a plate spoke for each cutter spoke, the plate spoke forming a central rib on the convex side of the cutter spoke and extending radially to the hub.

A further object of the invention is to provide a cotton chopper of the character indicated above including an arcuate shoe plate for each cutter spoke adjacent to the outer edge thereof and curved to be coaxial with the hub.

An additional object of the invention is to provide a cotton chopper of the character indicated above the cutter disc, hub shoe plates and plate spokes are permanently connected with each to form an integral unit for the purpose of supporting a plurality of radially adjustable chopper blades.

The invention consists in the details of construction and in the combination and arrangement of the several parts of my improved cotton choppers whereby certain advantages are attained, as will be hereinafter more fully set forth.

In order that my invention may be better understood, I will now proceed to describe the same with reference to the accompanying drawings, wherein:

Figure 1 is a view in elevation of a chopper constructed in accordance with an embodiment of the invention; and Figure 2 is a sectional view taken substantially on the line 2—2 of Figure 1.

The cotton chopper as herein embodied comprises a tubular hub 10. A shallowly concaved cutter disc 11 is provided with centrally located hole 12 through which the hub 10 extends. The cutter disc 11 is permanently secured to the hub 10 by welding or the like as indicated at 13. A plurality of cutter spokes 14 are formed on the cutter disc 11 by cut-outs 15 extending inwardly of the disc from the circumferential edge thereof. The side edges of the radially extending cutter spokes 14 run parallel to each other and the side edges of adjacent cutter spokes are curvedly connected with each other as at 16.

To the convex side of each cutter spoke 14 a centrally disposed plate spoke 17 is secured with one of its edges and extends all the way across the cutter disc 11. It abuts on the hub 10, to which it is permanently secured by welding or the like as indicated at 18 and to which it is radially disposed.

An arcuate shoe plate 19 is permanently secured as at 20 to the convex side of each cutter spoke 14 adjacent to the outer edge thereof and is disposed so that it is coaxial with the hub 10. Each shoe plate 19 is firmly connected with the adjacent plate spoke 17 by welding or the like as at 21, and extends an equal distance beyond both side edges of the cutter spoke 14.

In each of said cutter spokes two radial slots 22 are provided. They are located equidistantly from the plate spoke 17 and their outer ends are adjacent to the outer edge of the cutter spoke. A chopper blade 23 is shaped to fit onto the concave side of the outer marginal portion of each cutter spoke 14. Each blade is provided with a pair of holes 24 located so that they coincide with the slots 22 in the cutter spokes. Bolts 25 extend through the slots 22 and the holes 24 and secure the chopper blades 23 to the cutter spokes 14 so that the blades can be adjusted to work at a desired depth in the ground. The lower or outer edge of each blade is beveled to form the cutting edge 26 of the blade 23 and the outer marginal portion 27 of each blade 23 extends beyond the cutter spoke 14 and is curved away from said spoke.

In the tubular nave or hub 10 ball bearings 28 and 29 or the like are arranged and a stub shaft 30 extends through said bearings. The stub shaft is formed on and extends at right angles from a support shank 31 adapted to be secured in the front plow connection of a cultivator or the like (not shown).

We claim:

A rotary cotton chopper, comprising a tubular hub, a concavo-convex disk secured to the hub, a plurality of radial spokes formed by cutouts from the outer portion of the disk, an arcuate shoe plate secured to the convex side of each spoke adjacent to the outer end thereof and extending laterally outwardly from the convex side thereof, a plate spoke forming a central rib on the convex side of each radial spoke and secured radially of and to the hub, the disk and the shoe plate, and a cutter blade mounted for radial adjustment on the outer end of each of said disk spokes at the concave side of said disk, the cutting edges of said blades being arcuate and projecting beyond the outer surfaces of said shoes.

WILLIAM H. MAYBERRY.
C. R. MAYBERRY.

REFERENCES CITED

The following references are of record in the file of this patent:

UNITED STATES PATENTS

| Number | Name | Date |
|---|---|---|
| 409,718 | Vilbert | Aug. 27, 1889 |
| 961,113 | Ewing | June 14, 1910 |
| 2,137,233 | Brotzman | Nov. 22, 1938 |